United States Patent [19]

Hore

[11] Patent Number: 4,991,301
[45] Date of Patent: Feb. 12, 1991

[54] INDUCTIVE DISPLACEMENT SENSORS

[75] Inventor: Donald L. Hore, Bristol, United Kingdom

[73] Assignee: Radiodetection Limited, United Kingdom

[21] Appl. No.: 313,186

[22] PCT Filed: Feb. 26, 1988

[86] PCT No.: PCT/GB88/00141

§ 371 Date: Feb. 10, 1989

§ 102(e) Date: Feb. 10, 1989

[87] PCT Pub. No.: WO88/06716

PCT Pub. Date: Sep. 7, 1988

[30] Foreign Application Priority Data

Feb. 27, 1987 [GB] United Kingdom ............ 8704606
Aug. 3, 1987 [GB] United Kingdom ............ 8718333

[51] Int. Cl.$^5$ .............................................. G01C 9/06
[52] U.S. Cl. .................................... 33/366; 33/1 PT; 336/135; 340/870.31; 324/207.15; 324/207.25
[58] Field of Search ............ 33/366, 1 N, 1 PT; 336/135; 324/207.15, 207.18, 207.23, 207.24, 207.25; 340/870.31

[56] References Cited

U.S. PATENT DOCUMENTS

| | | | |
|---|---|---|---|
| 2,488,734 | 11/1949 | Muller | 336/135 |
| 2,975,384 | 3/1961 | Geiser | 336/135 |
| 3,001,127 | 9/1961 | Pirites et al. | 336/135 |
| 3,059,343 | 10/1962 | Kermode | 33/366 |
| 3,061,805 | 10/1962 | Broderson | 336/135 |
| 3,123,785 | 3/1964 | Moller | 336/135 |
| 3,184,861 | 5/1965 | Conrad | 33/366 |
| 3,839,904 | 10/1974 | Stripling et al. | 33/366 |
| 3,911,592 | 10/1975 | Crask | 33/366 |
| 4,507,965 | 4/1985 | Stratton et al. | 33/366 |
| 4,700,189 | 10/1987 | Welburn | 340/870.31 |
| 4,764,767 | 8/1988 | Ichikawa et al. | 336/135 |
| 4,870,358 | 9/1989 | Glaize et al. | 324/207.25 |

FOREIGN PATENT DOCUMENTS

| | | | |
|---|---|---|---|
| 0067404 | 4/1984 | Japan | 324/207.15 |
| 0174702 | 10/1984 | Japan | 33/366 |
| 2177411 | 8/1987 | Japan | 33/366 |
| 197707 | 7/1977 | U.S.S.R. | 33/366 |
| 0690288 | 10/1979 | U.S.S.R. | 33/366 |
| 0964695 | 10/1982 | U.S.S.R. | 340/870.31 |
| 1076748 | 2/1984 | U.S.S.R. | 33/366 |
| 1439405 | 11/1988 | U.S.S.R. | 33/366 |

Primary Examiner—Thomas B. Will
Attorney, Agent, or Firm—Larson and Taylor

[57] ABSTRACT

Two members 21,22 are relatively displaceable along a linear or circular path. One member 21 provides a plurality of coil portions along the path. Their individual inductances are dependent on the configuration of the second member 22. For example, the first member 21 may be an annular stator with inward radial projections k,l,m . . . on which the coil portions are wound, alternately in different senses so that the flux path tends to loop in and out. The second member 22 may be an annular rotor, one section 23 being ferromagnetic and the other section 24 being non-ferromagnetic and/or having a conductive screening layer. Alternatively the second member may be mercury 42 half-filling an annular conduit 40 which surrounds a static ferromagnetic core 44 (FIG. 9). A particular characteristic is that for any relative position of 21 and 22, half the coil portions of 21 have a different inductance from the other half.

13 Claims, 7 Drawing Sheets

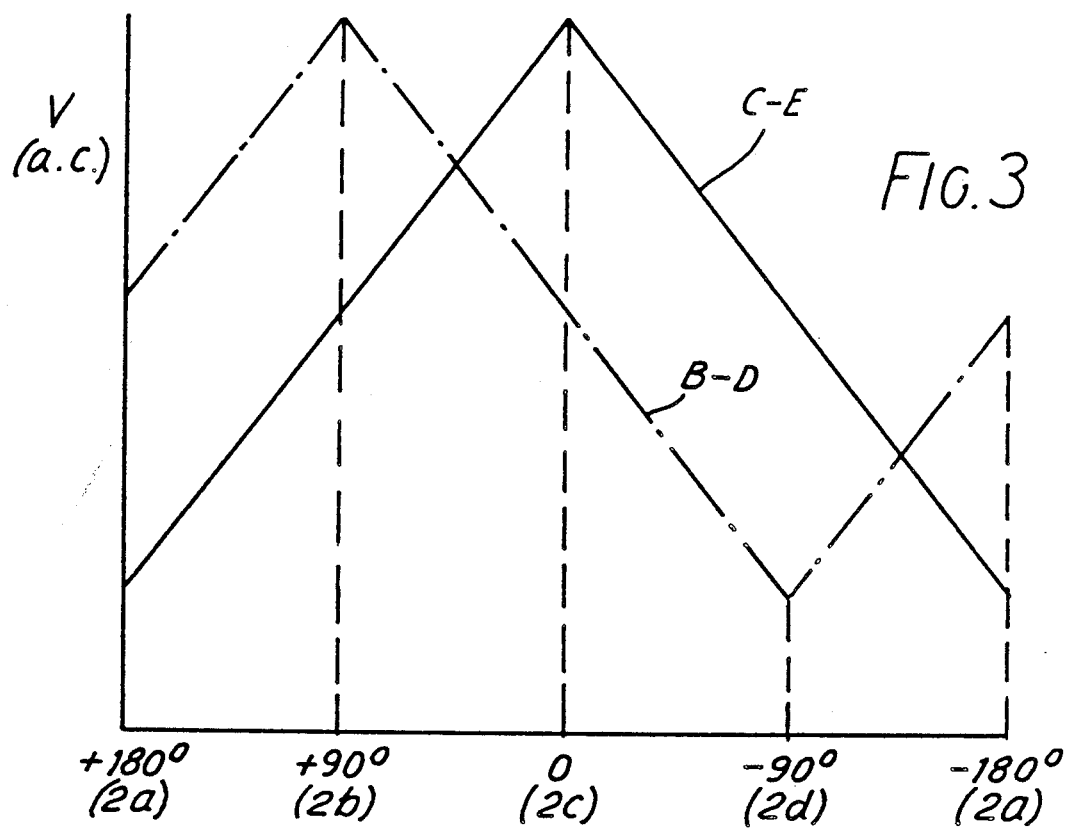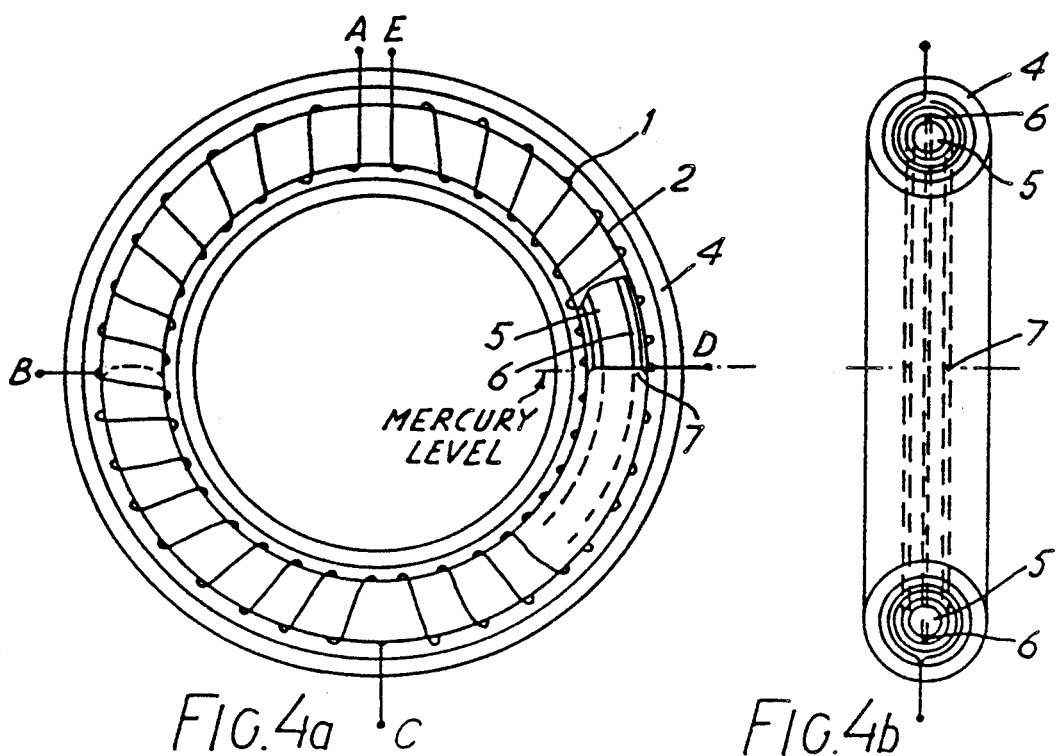

INDUCTIVE DISPLACEMENT SENSORS

The present invention relates to sensors that use variable inductance to provide analogue electrical output data relating to displacement. The displacement may be linear or rotary and may relate to variation in orientation, shaft angle, or linear motion.

Electrical data corresponding to degrees of angular rotation or displacement, together with associated or derived information regarding speed, direction and total turns traversed, are required increasingly for measurement and control purposes in many fields of application to machinery and robotics above and below ground. Such data may also be needed in nominally static applications in order to establish or measure a degree of tilt, or warn operators of moving machinery against hazards arising from excessive tilt. While there are many ways of deriving the information electrically, from simple potentiometers when sliding contacts are acceptable through to precision capacitance-based biaxial tilt sensors, most analogue devices are limited in the angular range which can be encompassed by a single channel of measurement. All, however, give absolute information, i.e. the data is available at switch-on and under standstill as well as dynamic conditions. Embodiments of the present invention employ a new approach to the problem of designing the most cost-effective methods of deriving angular data. The same principle can be extended to cover linear motion and displacement sensing.

It would be advantageous to provide means for electrical sensing of shaft rotation for 360° or continuous rotation which does not involve electrical connections to both stator and rotor and the conversion of sinusoidal into linear data. For linear displacement using a wound stator (which is a relatively expensive item), it would be advantageous to be able to measure displacement of a relatively movable element over at least the full length of the stator. For linear or rotary displacement, a linear output would be convenient.

According to the present invention there is provided apparatus for use in providing analogue electrical output data relating to displacement comprising first and second members having ferromagnetic cores separated by a constant spacing, said cores defining a magnetic circuit and extending in parallel along a path which intersects the flow path of said magnetic circuit; said first member comprising a wound portion having a winding comprising a plurality of coil portions disposed along said path and connected in series; said plurality of coil portions having a first terminal at one end of the series, a second terminal at the other end of the series, and a central tapping connection; means being provided for supplying a.c. across said terminals to provide magnetic flux around said magnetic circuit; said second member being constructed and arranged so that it has regions of different effective permeability to alternating magnetic flux along its length which affect the inductances of adjacent coil portions of said winding; and wherein at least a portion of the second member is displaceable relative to the first member along said path to effect displacement of the regions of different effective permeability relative to the coil portions; the arrangement being such that, for any relative position, the coil portions of one half of the length of the wound portion have higher inductances than the coil portions of the other half; whereby when a.c. is applied across the terminals and said relative displacement is effected, the voltage at the central tapping connection varies with a substantially linear analogue characteristic for a displacement corresponding to one half of the length of the wound portion, and continued displacement in the same sense for a further half length restores the voltage to its original value in a symmetrical manner.

The winding may have a pair of intermediate tapping connections provided respectively midway between the first terminal and the central tapping, and midway between the central tapping and the second terminal. These can be used to provide an output which is high for one half-length displacement and low for the other, so defining to which half-length displacement the first analogue voltage at the centre tap applies.

In one preferred form, the sensor apparatus comprises a toroidal coil having displaceable core means which occupies only a part of its circumferential extent. In another preferred form, the displaceable material is electrically conductive and suitably fluid, and acts to establish a short-circuit around a (generally static) core. In either case, turning the coil urges displacement of the displaceable material, and a region of the coil has an inductance which varies in dependance on its degree of occupancy by that material. There are means for deriving data relating to the inductance of at least one angular region of the coil. Thus there are means for applying an a.c. voltage across the coil (e.g. comprising a pair of terminals and possibly power supply means). There may be means for measuring the voltage drop across a region.

The displaceable material means occupy about 180° of the coil. There are terminals or taps at 180°, preferably 90°, intervals.

The displaceable core means may be provided by rolling elements, e.g. ball-bearings. They may be held at regular spacings e.g. by cage means displaceable with them.

If it were possible to push the core means round from outside by a rotating shaft, the output voltage change would relate to shaft position. This is clearly a practical impossibility because the toroidal winding is in the way. But an analogous result can be obtained if the device is adapted in the following ways:

(a) by rearranging the magnetic path, so that instead of being confined within a toroid, it loops in and out of a stator via a rotor in pursuing its circumferential path around the sensor;

(b) by varying the relative permeabilities of two 180° sections of the rotor surface.

Thus a further type of embodiment provides a displacement sensor comprising a multiplicity of wound salient poles disposed successively along a displacement path, alternate poles being of opposite polarity; and an inductance varying member which is arranged to be displaced relative to the poles by said displacement; said member being arranged so that in any given position it influences the inductance of only half of the poles or influences different halves thereof in different ways; whereby when an a.c. signal is fed to the poles, said relative displacement leads to a variation in the voltage drops across the poles or pluralities thereof which is indicative of the displacement.

Generally the poles will be disposed so that their axes intersect the displacement path.

The inductance varying member may have successive portions along the displacement direction which are of different magnetic permeabilities.

In one form, the poles are provided in an annular array surrounding a rotor which provides the inductance varying member. (Alternatively, the apparatus may be "inverted". with the rotor external to the stator.)

In a second form, the poles are in a substantially linear array and said member is elongate in that direction.

Some embodiments of the invention will now be described with reference to the accompanying drawings, in which:

FIG. 3 is a graph of sensor output voltages;

FIGS. 4a and 4b are views similar to FIGS. 1a and 1b but showing a second embodiment;

FIG. 13 being a section on Y—Y in FIG. 12;

Figure 1A:
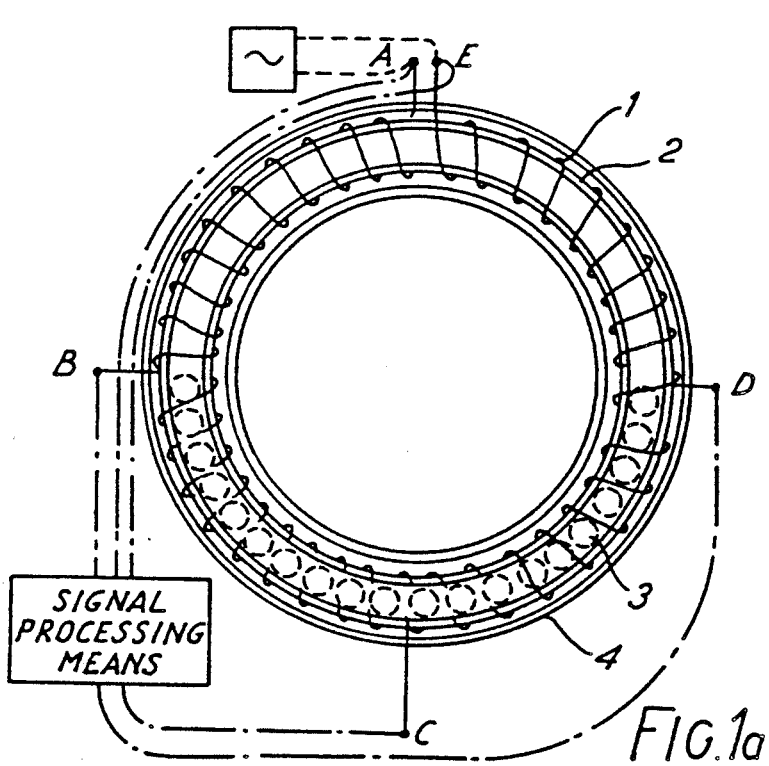
FIG. 1a is an axial view of a first embodiment of a rotary sensor according to the invention.
Figure 1B:
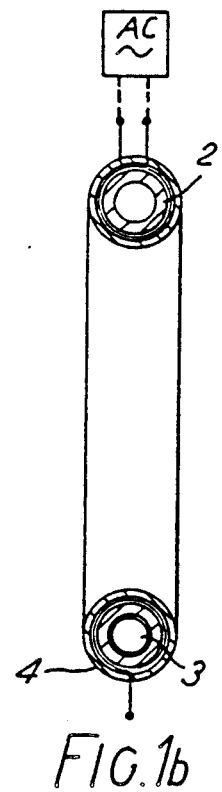
FIG. 1b is a sectional view of the sensor in a vertical axial plane.

The sensor shown in FIGS. 1a and 1b has a hollow toroidal former 2 which may be constructed of any suitable non-magnetic non-conducting material such as a plastic. On the former 2 is wound a continuous equispaced toroidal winding 1. Inside the former 2 is a halfrace of ferromagnetic balls 3, which may be separated and journalled in a suitable cage which, as in a conventional ball-bearing. allows the balls to roll freely without scuffing each other, but retains them in position relative to each other so that, in this example, they occupy 180° of the available circular track provided by the former 2. Outside the winding 1 is a hollow toroidal housing 4 of ferromagnetic material to complete the flux path and screen the sensor from external fields and from interfering with other apparatus with its own fields.

The winding is fed with an a.c. at any suitable frequency across terminals A and E. Tapping points B,C and D are provided at 90° intervals.

If the sensor is in the position shown in FIG. 1, with terminals A and E at the top, gravity will cause the balls to occupy the lower half B-D of the toroid. The presence of the ferromagnetic balls will cause the inductance of winding section B-D to be much higher than the other half (made up of sections A-B and D-E). Thus the reactance of the coil region (here B-D) occupied by the balls is high. For an alternating current applied across the terminals AE, it is as if the balls provide an impedance which is movable around the coil. In the orientation shown in FIG. 1, when an alternating voltage is applied across the terminals AE, the voltage across terminals B-D will be maximum. If the device is rotated through 180°, the balls will occupy the other half, so that the inductance and therefore the voltage between points B and D will be minimum. This voltage measurement therefore gives a means of detecting which way up the sensor lies: it will give a high voltage in one and a low voltage in the other.

Figure 2:
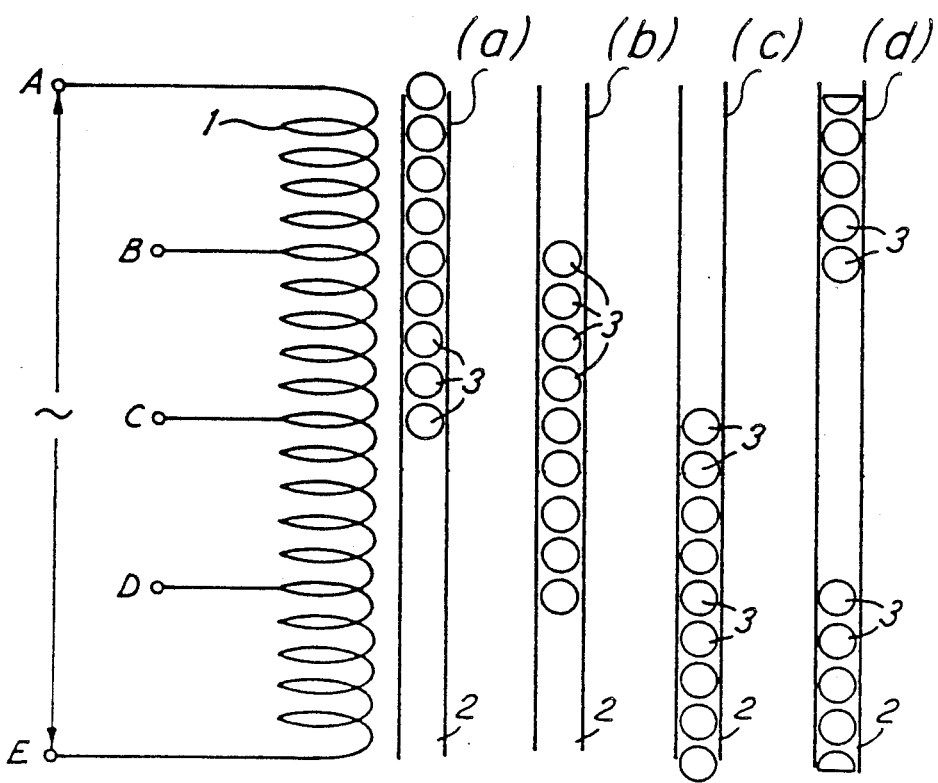
FIG. 2 is a schematic view of the sensor.

The tapping point C (diametrically opposite the terminals AE) enables a reading to be obtained proportional to the angle within 180°, the connections being shown in FIG. 2. That figure also shows, at (a),(b),(c) and (d). different positions of the set of balls, differing by 90° steps.

If the sensor is turned so that terminal D is uppermost, the balls will occupy section A-C as shown at 2, position (a). This maximises the inductance of this section, and therefore the voltage drop across it. The voltage across C-E will then be a minimum, being primarily due to winding resistance only.

As the sensor is turned clockwise from this position, the inductance of, and therefore the voltage across, section C-E will rise as the balls enter the section. The voltage across section A-C falls correspondingly. By the time the position shown in FIG. 1 is reached (corresponding to FIG. 2, position (b)). there will be equal inductances in A-C and C-E, so that the voltage across C-E will be at a midway level. At the same time, the voltage across B-D will be at its maximum.

Further rotation clockwise will increase the inductance and voltage across section C-E until all the balls are in this section (FIG. 2, position (c)), and the voltage across C-E reaches its maximum. Thus there is an analogue voltage signal across C-E which varies from minimum to maximum over 180°.

Further rotation clockwise will cause the inductance and voltage of section C-E to fall again. It has its midway value when the balls are in section B-A-E-D (FIG. 2, position (d)). At this time the voltage across B-D is at its minimum value.

Thus if the voltage across B-D is monitored, detection of whether it is above or below its midway value can provide an indication of which of two 180° sectors is occupied by the balls, and hence which of the arms of the C-E voltage characteristic applies. The value of the C-E voltage can then be used to determine the rotational state. The relationship between these voltages and rotation is graphically displayed in FIG. 3. It will be appreciated that FIG. 3 is schematic. The characteristics may not in fact be straight lines, and those in FIG. 3 are not intended to represent exact measurements.

While the embodiment described uses a moving ferromagnetic core in the form of a semicircular race of balls, there are many other possible constructions to produce the same effect, such as a semi-toroidal solid core of steel or ferrite suitably journalled on anti-friction bearings, or a ferromagnetic fluid half filling the toroidal former.

A rather different approach is exemplified in FIGS. 4a and 4b. This utilizes the introduction of a moving short-circuit means to reduce the inductive reactance of a section of winding on a ferromagnetic core. In this example the short-circuit means can take the form of mercury within the toroidal former.

As shown in FIG. 4, the construction can have many similarities to the first embodiment. Thus a toroidal winding 1 surrounds a former 2, but the two halves of the winding A-C and C-E are oppositely wound to produce opposing fluxes, which will be coupled by leakage to the surrounding ferromagnetic housing 4. Inside the toroidal former 2 is a complete toroid 5 of ferromagnetic material such as steel or ferrite, of smaller cross-section so as to leave an annular space between it and the former 2. It is fixed in position within the former 2 by a conducting ring 6, e.g. of copper or brass with a mercury-resistant coating (e.g. nickel plate). The annular space is half-filled with mercury 7, so that half the circumferential length of the core 5 is embraced by a short-circuit through the mercury 7 and conducting ring 6.

The effect of rotation against gravity on the voltages at the same tapping points will be similar to FIG. 2 but in the opposite sense, if the mercury short-circuit is substituted for the ball race in the same positions. At FIG. 2 position (a), the column of mercury across winding section A-C will minimise its reactance and voltage drop, so that the voltage C-E will be maximum. At FIG. 2 position (c), the opposite will be the case, so that output voltage C-E will be minimum. The voltage will therefore vary similarly over 180° between maximum and minimum, while the voltage B-D will again enable a plus and minus logic signal to be derived from relative voltage level.

Use of this construction using mercury offers an advantage over the moving iron version in terms of hysteresis, which results from mechanical stiction of the ball race or equivalent, particularly if the sensor is tilted sideways from vertical. However, a further embodiment employing mercury which is easier to produce will be described later with reference to FIG. 9.

Figure 5:
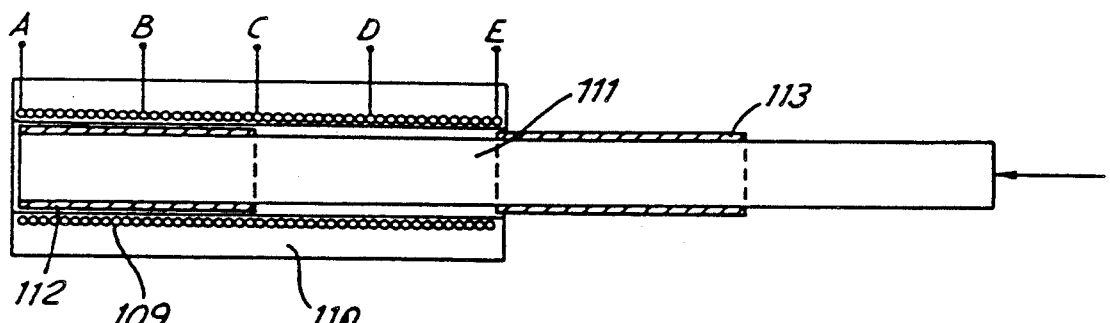
FIG. 5 shows a linear embodiment of the present invention in side elevation.

The same principles can be applied to produce a linear motion sensor, as shown in FIG. 5. This shows a winding (109) axially wound inside a tube of ferromagnetic material (110) such as ferrite or iron powder in a suitable plastic base, to provide a return path for the flux as provided by the outer housing 4 of FIG. 1. This winding comprises the same four sections A-B,B-C,-C-D,D-E as in the toroidal version, but forming a continuous evenly laid spiral winding.

The moving core (111) is a ferromagnetic rod, carrying two sections (112) and (113) of short-circuited conductor such as copper or aluminum tube, each section representing half the length of winding (109). In the position shown, winding section A-C is linked with short-circuit (112) and has therefore minimum inductance, while section C-D is only linked to ferromagnetic core, and has therefore maximum inductance. Moving the core (111) to the left will obviously increase the inductance of A-B as short-circuit (112) leaves it, while the corresponding introduction of short-circuit (113) will reduce the inductance of section C-E. Measurement of the relative voltages at the tapping points as already described with a.c. excitation across A-E will give analogue levels related to the position of the core. Again, the level at mid-point tap will rise and fall symmetrically with half length movement, and which half can be determined by the relative levels across B-D. It may be found beneficial to wind sections A-C and C-E in opposition, thus reducing the coupling between winding section C-E and short-circuit (112) in the illustration, and similarly between A-C and (113) as the core is moved.

While the linear motion sensors of similar outward appearance in the linear variable differential transformer (LVDT) construction have been in use for many years, an advantage offered by this invention over them is that the signal range available with the LVDT corresponds only to approximately half the length of the winding, but the FIG. 5 construction enables the full length to be measured (with a corresponding increase in length of the moving core), equivalent to the ±180° of the rotary sensors.

In the rotary and linear examples illustrated, the analogue range corresponds to plus and minus half a turn or half a length. It is clearly possible to provide alternatives. For example, a rotary sensor may be required to provide information which repeats every 180° in a 2-pole motor control application. For this, the sensor rotor can be made 4-pole by presenting two pairs of 90° sections of different permeability in place of the two 180° sections (3) and (4), while the stator need comprise only 180° compass (again of a multiple of four poles to provide the required tapping points). The resulting analogue will be 90° from A-C or C-E, with plus and minus assigned from B-D.

For multi-turn applications, two sensors can be used, one of them being geared down by a suitable multiple, as in conventional synchro or resolver systems. For longer linear applications, a series of stators can be laid end-to-end, and their inputs and outputs switched in sequence as the pair of moving screens or cores traverses the full length of them, the switching signals being derived by programme from the preceding length.

Figure 6:
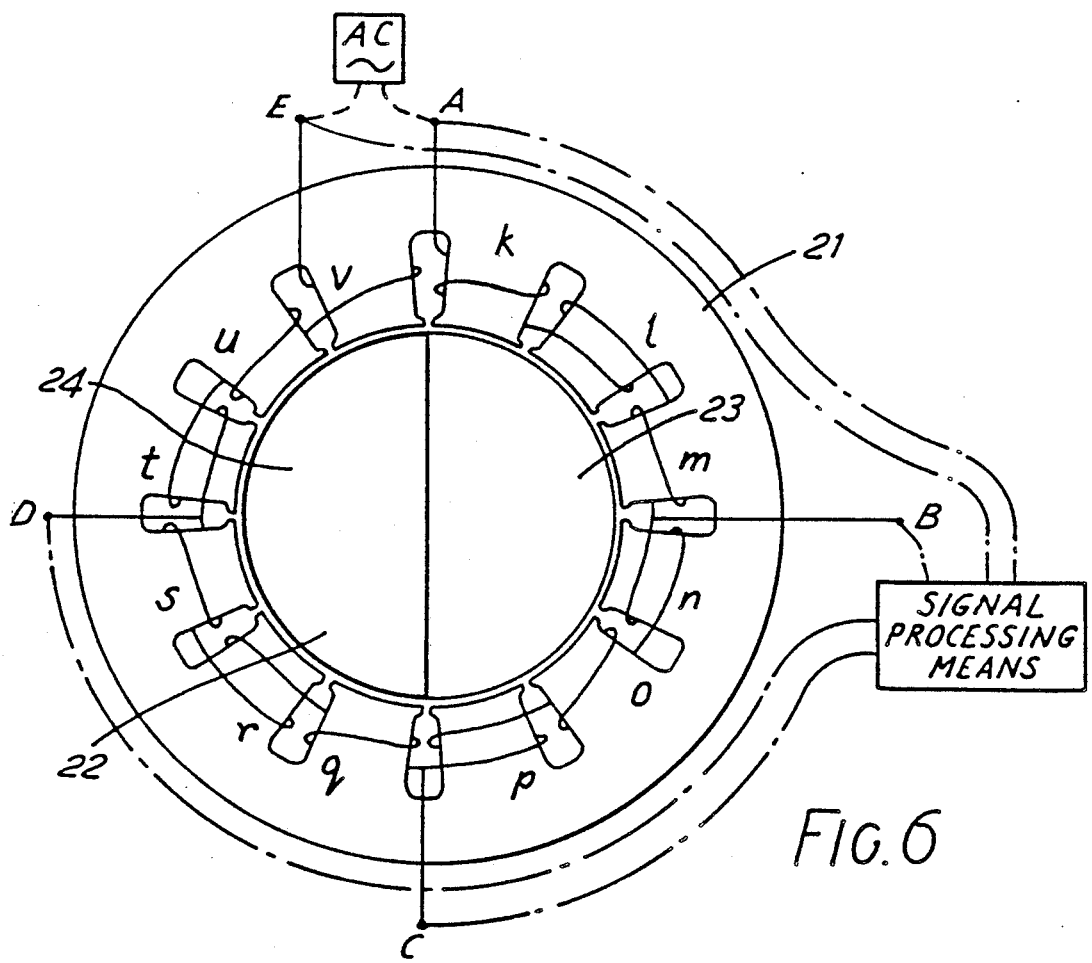
FIG. 6 is an axial view of a third rotary embodiment of the present invention.
Figure 7:
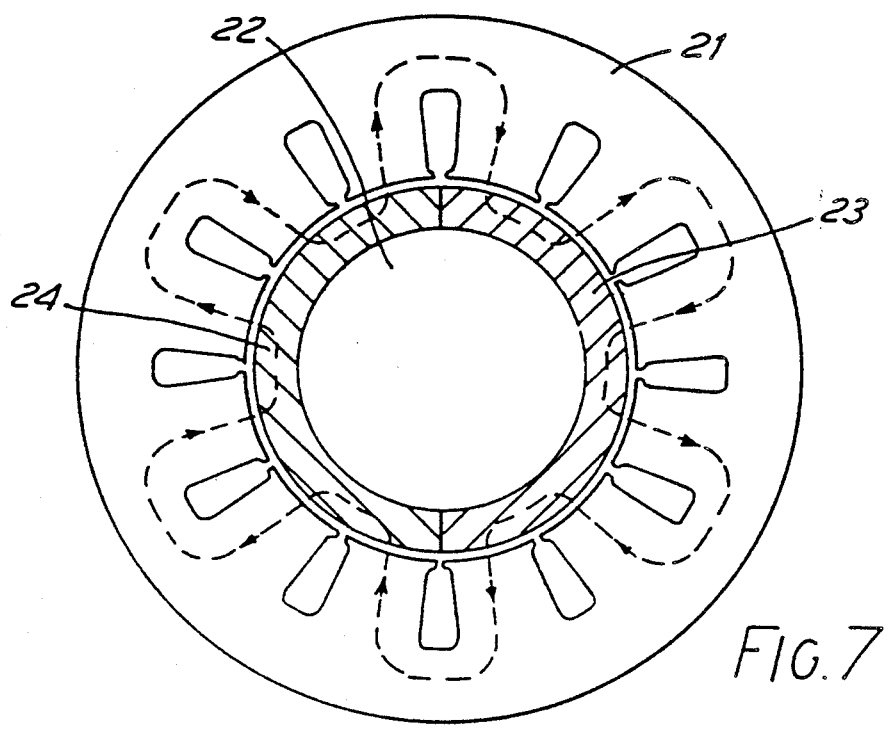
FIG. 7 is a view similar to FIG. 6 showing the path of the magnetic flux, and also showing an alternative form of rotor.

The rotary embodiment shown in FIGS. 6 and 7 has an annular stator 21. This has inwardly extending salient poles numbering any multiple of four, and is illustrated with twelve poles (k to v) by way of example. All poles are embraced by respective windings of equal numbers of turns and wire size, and so connected that odd and even pole numbers are of opposite polarity. The windings are all connected in series to an a.c. supply, with the result that the flux loops into and out of the rotor 22 as indicated by the broken line in FIG. 7.

The surface of a rotor 22 which lies in the centre of the annular stator is divided into two 180° sections 23 and 24 of different effective permeability. This difference may be achieved in various ways, e.g.:

(a) by making one section 23 of ferromagnetic material, and the other section 24 of non-magnetic non-conducting material such as plastic;

(b) as (a) but with the non-magnetic section 24 of conducting metal, to couple a short-circuiting layer with that section of the stator influenced by section 24 and thus further reduce its effective permeability;

(c) by making both sections 23 and 24 or the whole rotor core of ferromagnetic material, but introducing a short-circuiting layer of conducting metal such as copper or aluminum into one section 24, either in the form of a connected series of short-circuit bars as in a conventional squirrel cage rotor, or simply as a surface layer. In either case, the minimal gap between the ferromagnetic cores of stator and rotor maximises the coupling between stator windings and rotor cage or screen in the short-circuited section 24.

In each case, the stator windings on the poles facing the first section 23 will have a higher inductive reactance and corresponding voltage drop. The ferromagnetic cores of stator and rotor may be manufactured using conventional punched laminations, or moulded in ferrite, or a matrix of iron or ferrite powder in a suitable resin or plastics base. The latter is potentially beneficial in that the stator windings and rotor screen or cage may be moulded in at the same time.

As the rotor is turned, there will be a stepped change of output voltage as each stator slot is passed by the interface of the sections 23,24 of the rotor. These steps are preferably smoothed out in the manner conventional for electrical machines by skewing the stator slots relative to the rotor axis, or the interfaces of the sections 23,24 of the rotor relative to the stator slots. Again the moulded core construction facilitates incorporation of skew in the stator or rotor tooling.

Each pole constitutes a step up or down towards the total inductance of the half winding to which it belongs. Without skewing, the characteristic would be stepped in pole increments, so that the more poles there are, the finer the increments. These increments are smoothed by the skew, which only needs to embrace one pole width to smooth the step increment. Thus using only four poles requires a skew of 90°, while 24 poles would need only 15°. A practical result of this is that a device of many poles can be made shorter than one of few poles.

FIG. 6 shows the winding arrangement and connections to the stator, the rotor being illustrated for simplicity in its screened form i.e. with the second section 24 having a surface layer of copper or aluminum on a ferromagnetic core.

In the position drawn, poles k-p are coupled to the high permeability section 23 of the rotor, while poles q-v are coupled to the short-circuiting screen of section 24. With a.c. applied to terminals A and E, there will then be a greater voltage drop across terminals A-C than C-E. As the rotor is turned clockwise, voltage A-C will fall and C-E rise, until at the 180° position C-E is maximum and A-C minimum. Further rotation will reverse the change until the original position is reached, so either voltage C-E or A-C may be used as an analogue of shaft angle, over 180°.

Figure 8:
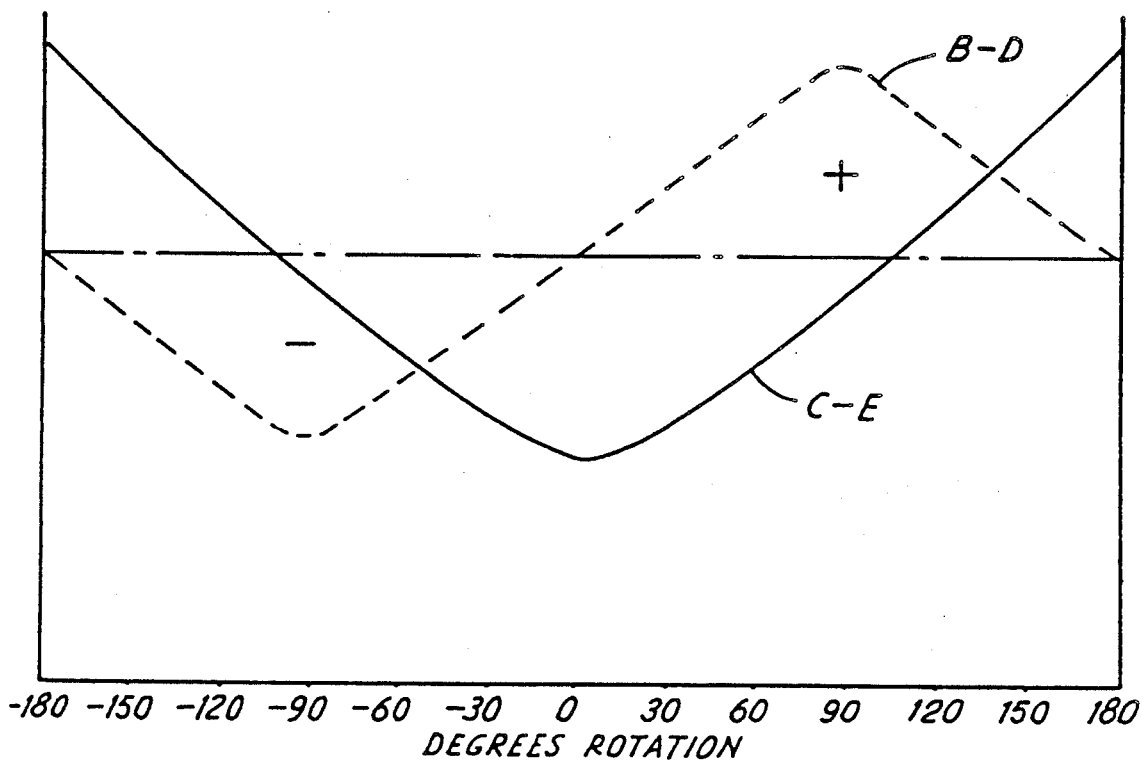
FIG. 8 is a graph showing output voltages of the sensor.

Again, as indicated in the previous application, tapping the intermediate points between poles m and n and poles s and t at terminals B and D will also produce a 180° analogue voltage change which is shifted 90° from that of A-C or C-E. This can be used to assign a positive or negative sign to the 180° analogue of the other, because voltage B-D will be high in one half revolution and low in the other, thus enabling a 360° analogue output to be derived. These analogue voltages in RMS terms follow typical shapes as shown in FIG. 8, with some non-linearity due to phase shift and other errors. (The voltage characteristic across A-C is the inverse of that across C-E.)

Figure 9:
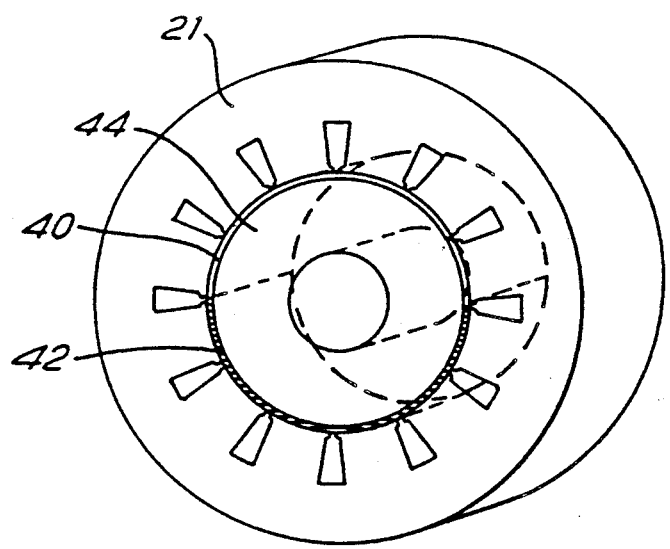
FIG. 9 is a perspective view of a fourth rotary embodiment.

FIG. 9 shows another rotary embodiment with a slotted, multi-pole stator 21 like that of FIGS. 6 and 7. But instead of a rotor it contains an annular non-metallic container 40, half-filled with liquid mercury 42. Within this there is a cylindrical fixed inner ferromagnetic core 44.

The stator 21 is wound with slots skewed (skew not shown) by one tooth pitch. The half-circumference with mercury between the cores will display a lower permeability than the half without, enabling the angular displacement of the sensor relative to gravitational force to be determined by the means already described.

Figures 10, 11:
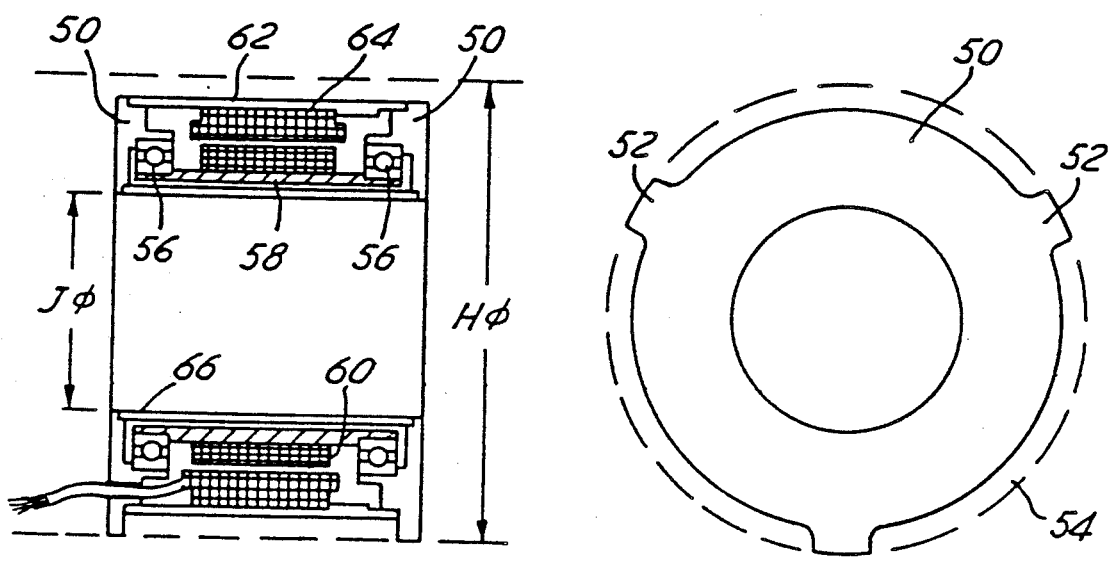
FIGS. 10 and 11 are an axial section and end view of a fifth rotary embodiment.

FIGS. 10 to 14 show a rotary embodiment intended for use in soil piercing tools or moles designed to be steerable. For correct steering, it is essential to know the roll angle of the mole relative to vertical. In addition, it is helpful if the roll sensor is of annular construction, so that the fluid power hose to the mole can pass through it, and exhaust air pass around it. A practical design of such a roll sensor is shown in FIG. 10. In this, diameter H is the inside diameter available within the mole to accommodate the sensor, and diameter J is that required for passage of the hose. The housing end flanges 50 are spaced by lugs 52 to leave spaces 54 for passage of exhaust air around the sensor. Flanges 50 incorporate bearings 56 in which a hollow shaft 58 is journalled. This in turn carries rotor 60 of one of the forms described, typically as shown in FIG. 6, the rotor annulus being primarily of ferromagnetic material such as ferrite or iron powder in a suitable bonding matrix, with half its circumference screened by a conducting layer of copper or aluminium. If of copper, the high density of this layer may be sufficient to provide the gravity bias, but additional weighting can be incorporated if necessary. Outer tube 62 holds the stator 64 of the form described for FIGS. 6 and 7, while inner fixed tube 66 provides for the complete housing to be enclosed and sealed, either by the use of sealants or the addition of O-ring or other appropriate sealing means (not shown).

The connections to the stator are as shown in FIG. 6, giving two 180° analogue outputs from the a.c. excitation displaced by 90° as already described.

The means for securing the assembly together are not shown; typically the flanges would be clamped between abutments designed for the purpose as part of the mole, but other securing means can be designed to suit the application.

Figure 12:
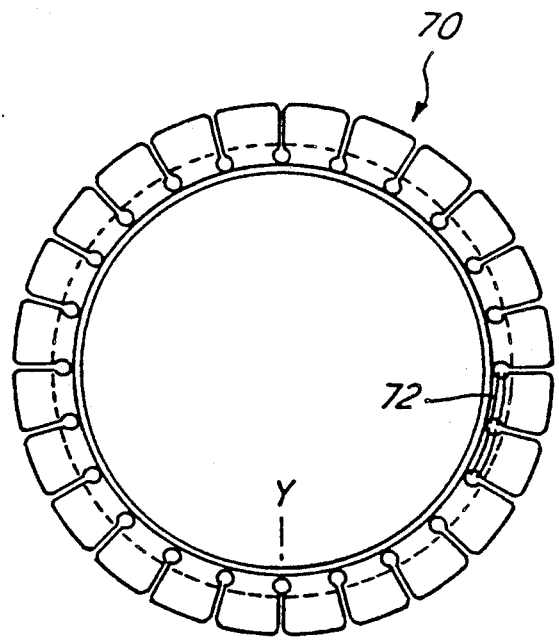
FIGS. 12 to 14 are views showing details of the fifth embodiment.
Figure 13:
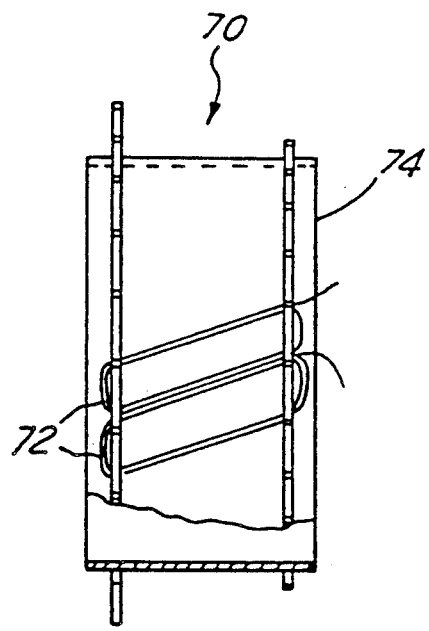
Figure 14:
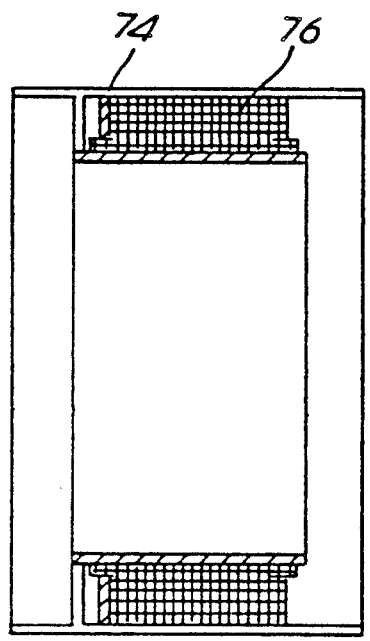

While the stator can be made in the conventional form for electrical machines using punched laminations of appropriate steel thickness, subsequently wound with the appropriate number of turns per pole, this process involves also provision of means to secure the windings in place in the stator slots. An alternative construction which can be used with advantage for this type of low-power high-frequency a.c. device is to mould the stator magnetic circuit from iron or ferrite powder bonded in a suitable matrix of plastic or resin, incorporating the windings at the same time. A method of achieving this is to wind the stator on a former 70 moulded from plastic or other insulating material as shown in FIG. 12. This has the advantage that the windings 72 are inserted from outside the former, rather than from inside the stator, making machine winding easier, and eliminating the need for slot liners and wedges. The wound former is then fitted into a suitable housing 74, and filled with the magnetic moulding material 76 as shown in FIG. 13. The result is a moulded wound stator with the inside diameter lined with the plastic material of the winding former. This can then be machined out as necessary to leave the minimum thickness of material protecting the windings, minimising the air-gap between stator and rotor. The illustrations relate directly to the roll sensor embodiment, but the technique is equally applicable to all the rotary and linear forms of the multipole construction of the invention.

To avoid a stepped output with displacement, the rotor and stator must incorporate relative skewing of at least a pole pitch. This can be done by either shaping the leading and trailing edges of the high/low permeability interfaces of the rotor, or by winding the stator with skew of a pole pitch. This latter approach is indicated in the winding sketched in on FIG. 13. Similar skewing can be incorporated in linear equivalents.

Figure 15:
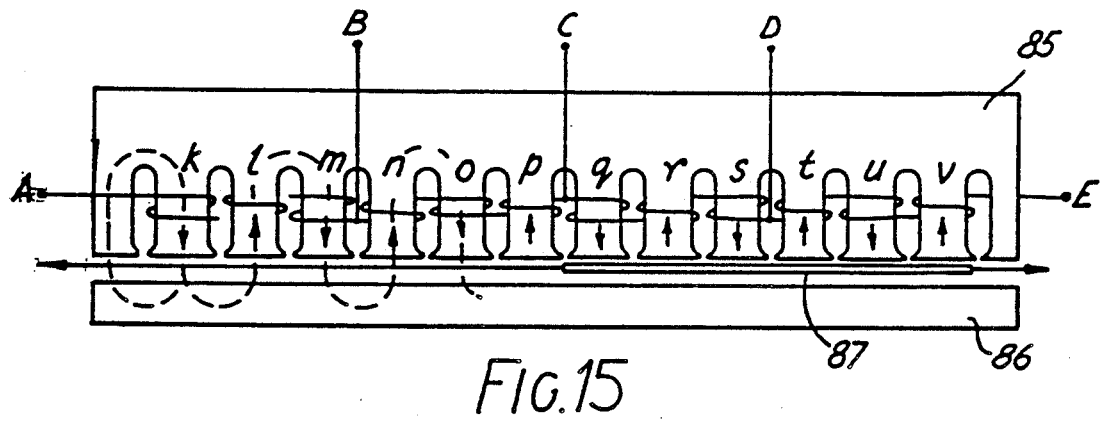
FIGS. 15 and 16 show a second linear embodiment of the present invention in side elevation.
Figure 16:
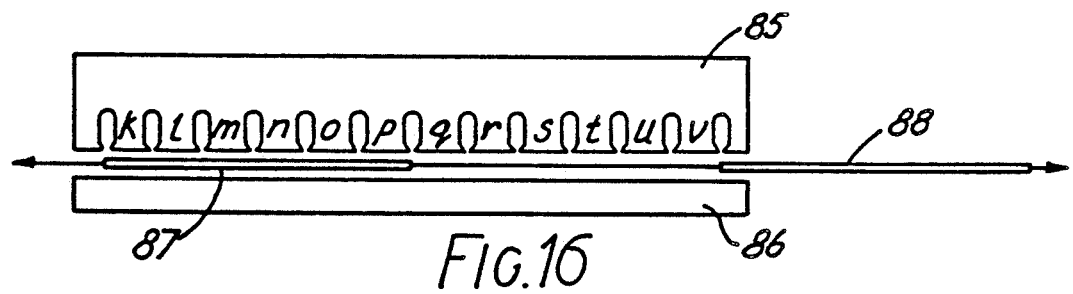

FIGS. 15 and 16 show a 12-pole linear construction equivalent to the rotary embodiment of FIGS. 6 and 7.

The stator 85 has odd and even poles oppositely and equally wound, and the rotor is replaced by a longitudinal member presenting effectively half the stator length of high and half of low permeability. Again there are a number of ways of achieving this, as described for the rotor. The simplest is probably the use of a static ferromagnetic member 86 to provide a path for the stator flux, with a copper or aluminium sheet as a movable screen 87 in the air gap. In the position shown in FIG. 15, it is coupled to poles q–v, which will have minimum inductive reactance, so voltage A–C will be high, C–E low. Moving screen 87 to the left will drop voltage A–C and raise C–E, so they will provide an analogue of half the stator length, equivalent to 180° of the rotary machine.

To produce an analogue for the full length of stator, FIG. 16 shows the need to duplicate screen 87 at 88 a half-length away from the first screen portion 87, the two portions 87,88 being mechanically coupled to move together. Then as one portion 87 moves out of range of the stator to the left, the other portion 88 moves in from the right to drop voltage C–E again. Tappings B and D connected to poles m–n and s–t respectively will again produce an analogue of half-length displaced by a quarter-length from A–C and C–E, so that plus and minus signs can be assigned to the half-lengths exactly as for the half-turns of the rotary machine.

While FIGS. 15 and 16 illustrate only one construction for the linear moving member, it will be obvious that moving a half-length of ferromagnetic material along the stator will produce a half-length analogue, which can be doubled by coupling a second similar half-length member a half-length away.

Reference is made earlier to the non-linearity effects of phase-shift on the analogue voltages A–C and C–E illustrated in FIG. 8. The reason can be understood from the diagram of FIG. 11 in which, at the left, the voltage drops are represented vectorially in a simplified version, ignoring second-order variables such as winding self-inductance and capacitance and the resistive effects of eddy current losses in the rotor. The impedance of winding A–E can be regarded as comprising simply the resistance of the wire, which is divided into two equal sections at the tapping point C, and inductance arising from the permeable section of the movable core. This inductance is constant, ignoring air gap and other mechanical tolerance variations, but its position is variable. The voltage across the inductive element will be phase-shifted by 90° from that across the resistive elements. With an a.c. current I flowing through the winding, resistance R and inductive reactance XL, the vector values of volt-drop to the mid-point tap C are therefore two resistive ones of value IR/2, joined by one inductive one of value IXL at right-angles to them. The effective position of the mid-point tap C will therefore be somewhere along the IXL line, depending upon how much of the inductance is in each half. When the inductance is maximum in section A–C, the centre tap will be at point C1. As inductance is moved towards section C–E, point C will move along IXL until all the inductance is in C–E and point C potential is at C5.

Clearly, the effect of moving the inductive core on voltage C–E for instance, will be non-linear, because its phase relative to voltage A–C will vary as indicated by the broken lines C2–E, C3–E, C4–E. Although points C1–C5 are equispaced along IXL there is a smaller difference in length and therefore voltage between C1–E and C2–E than there is between C3–E and C4–E. The same effect will be found in voltage A–C.

It is desirable that the change in voltage with angle should be as linear as possible. From the diagram it is clear that, although the voltage change is non-linear with respect to points A and E, it is linear between C1 and C5. If a reference point can be found on an extension of this line and the voltage measured with respect to it, the change will then be linear with angle.

Figure 17:
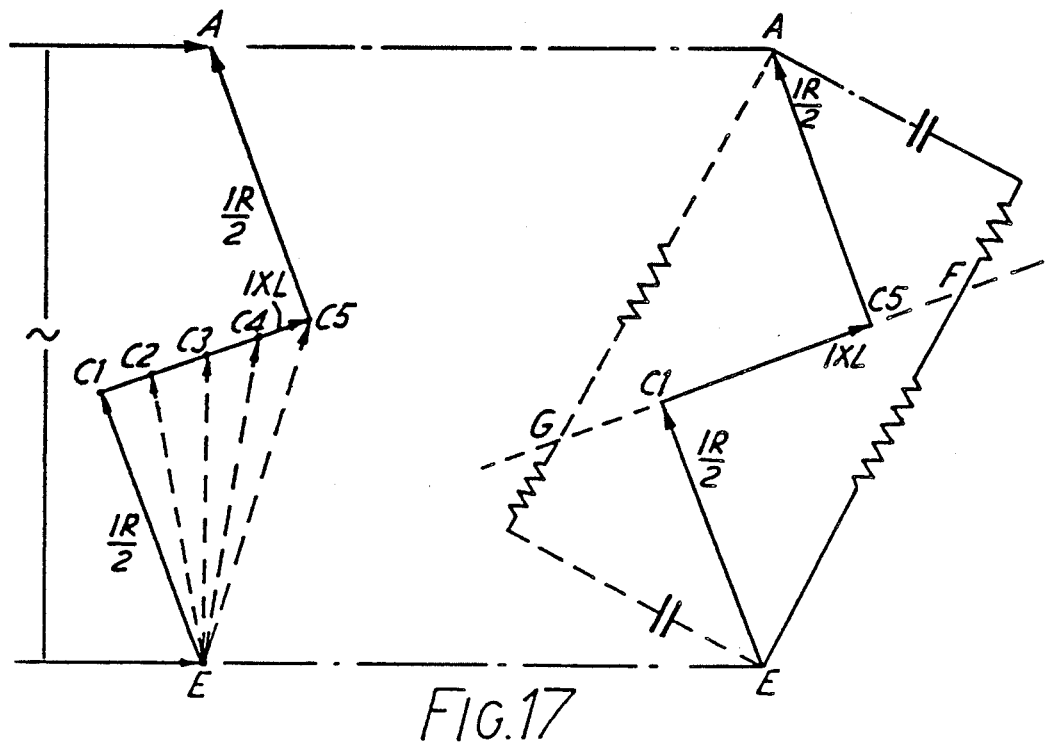
FIG. 17 is a vector diagram illustrating the problem of voltage drops in the windings.

The right hand part of FIG. 17 shows a method of achieving this. A compensating phase-shifting network is fed from terminals A and E, and the component values adjusted to produce a connection point with voltage amplitude and phase which brings it on to an extension of vector IXL on either side. This network may simply comprise a capacitor and tapped resistor, as shown (right) to produce a reference point F. The voltage between points C and F will then be a minimum at C5, i.e. when maximum inductance is in a section C–E. Any other position of the core will produce a higher voltage. The ratio of maximum to minimum voltage, i.e. effective zero offset of the analogue reading, can be altered by changing the component values to alter the phase-shift of F while keeping it on IXL extended, and so maintaining the desired linearity.

A similar network can be placed on the other side to produce an equivalent point G, to which the voltage from C will be minimum when P is maximum. So one can be used to compensate voltage A–C and the other C–E if required.

Instead of a capacitor-resistor network an inductor-resistor arrangement could be used with similar effect. Alternatively, a phase-shifted voltage of appropriate amplitude and phase can be generated at the same time as the supply to A–E, with appropriate adjustments for zero offset. The result of any of these is to remove the primary source of non-linearity from the analogue output, in any of the embodiments described.

Non-linearity is of less importance in the voltage B–D if it is only needed to assign plus or minus to the A–C or C–E 180° analogue voltage, because it is only necessary to sense its amplitude to determine whether it is above or below a set level.

In the discussion of FIG. 11 it was stated that second order variables such as resistive effects of eddy current losses in the rotor were ignored. An alternative approach to the design of all the sensors described is to emphasize these effects deliberately, so as to produce voltage/position analogues.

When short-circuiting effects of conductors or conducting sheet in the moving element are used to vary the impedance of a winding section, they are effectively introducing a secondary winding by transformer action. The resistivity of the copper or other conducting material is then reflected as an equivalent effective resistance in the apparent impedance of the primary winding. In the examples illustrated, there is a conducting layer in one half of the moving element, and none in the other.

An alternative is to present conducting layers in both halves, but of widely differing resistivity, while non-ferromagnetic. The inductive component variation is then replaced by a resistive component variation, e.g. by using copper in one half and high-resistance alloy in the other.

For practical use the a.c. analogue voltages are converted to RMS DC levels by electronic techniques familiar to those skilled in the art. For this purpose isolation of the a.c. signals may be required and provided by transformer coupling. If necessary, secondary windings can be incorporated in the stator to achieve this isolation.

The analogue levels may also be converted to digital using known A-D conversion techniques. A particular virtue of the basic analogue signals from the sensor is that the slope is directly related to and therefore a measure of speed. This can be differentiated simply to measure acceleration. The sign of the slope combined with the plus/minus sign from voltage B-D gives direction. The plus/minus sign logic gives number of half-turns (rotary) or half-lengths (linear) traversed, so that all the information customarily provided by tachogenerator and shaft encoder combinations is readily available from a simple analogue device with appropriate signal processing circuitry.

I claim:

1. Apparatus for use in monitoring displacement along a displacement path, said apparatus comprising first and second members extending along said displacement path and separated by a constant spacing, said first member comprising a wound portion having a single winding which provides a multiplicity of serially connected coil portions arranged as wound salient poles disposed successively along said displacement path with the axes thereof intersecting said displacement path; said poles being wound so that alternate poles are of opposite polarity; said multiplicity of serially connected salient poles including a first terminal at one end of the series of poles, a second terminal at the other end of the series of poles, and a central tapping connection; said second member comprising an inductance varying means for providing, along with displacement path, regions of different effective permeability to alternating magnetic flux which affect the inductances of adjacent coil portions of said single winding; at least a portion of said inductance varying means being displaceable relative to said first member along said displacement path to effect displacement of the regions of different effective permeability relative to said coil portions of said single winding such that, for any relative position, the coil portions of one half of the length of the wound portion have higher inductance than the coil portions of the other half; the apparatus further including means for supplying an alternating electrical voltage across said first and second terminals so that, when alternating current is applied across said terminals and said relative displacement is effected, the voltage at the central tapping connection varies with a substantially linear analog characteristic for a displacement corresponding to one half of the length of the wound portion, and continued displacement in the same sense for a further half length restores the voltage to its original value in a symmetrical manner; said voltage providing analog electrical output data relating to said displacement.

2. Apparatus according to claim 1 wherein said first member includes a ferromagnetic core with slots so as to define salient ferromagnetic core portions therebetween, said serially connected coil portions being wound on respective ones of said core portions.

3. Apparatus according to claim 2 wherein said slots are skewed relative to said displacement path so as to smooth the variation with displacement of the voltage at the central tapping connection.

4. Apparatus according to claim 1 wherein said regions of different effective permeability of the second member comprise two regions having an interface, and said interface is skewed relative to said displacement path so as to smooth the variation, with displacement, of the voltage at the central tapping connection.

5. Apparatus according to claim 1 further including signal processing means electrically connected to the central tapping for detecting the voltage thereat so as to provide a reading indicative of the displacement.

6. Apparatus according to claim 5 in which said winding has a pair of intermediate tapping connections provided respectively midway between the first terminal and the central tapping, and midway between the central tapping and the second terminal; said intermediate tapping connections being electrically connected to the signal processing means which is arranged to detect the voltage across said connections, to detect whether this voltage is above or below the midway value, and to thereby determine whether the voltage at the central tapping corresponds to a displacement in the range of the first half length of the wound portion or in the range of the second half length thereof.

7. Apparatus according to claim 1 wherein said first member and at least a portion of said relatively displaceable second member are relatively rotatable, and said predetermined path is circular.

8. Apparatus according to claim 7 wherein a rotatable one of said first member and said at one portion of said relatively displaceable second member is biased by gravity to a predetermined angular orientation relative to the horizontal, so that said electrical output data relate to the inclination of the apparatus.

9. Apparatus according to claim 1 wherein said second member includes a separated ferromagnetic core which is static and is separated from said coil portions by said path; said second member further including a displaceable portion comprising screening means extending over a length of the path equal to one half of the length of the wound portion.

10. Apparatus according to claim 9 wherein the first member comprises a stator including an annular member with radially extending core portions bearing said coil portions; said separated ferromagnetic core is located radially within the annular member; and said screening means comprises an annular conduit located between the separated ferromagnetic core and the coil portions, said conduit being partly filled with a conductive fluid.

11. Apparatus according to claim 9 wherein said path is linear and said displaceable portion of the second member comprises a plurality of screening means spaced from one another by a distance equal to one half of the length of the wound portion, each screening means extending over a length of the path equal to one half of the length of the wound portion.

12. Apparatus according to claim 1 wherein said second member comprises a ferromagnetic core member which is relatively displaceable along said path; a portion of the ferromagnetic core member of said second member including short circuiting means on the surface thereof to reduce its effective permeability.

13. Apparatus according to claim 1 wherein said second member comprises a relatively displaceable core member comprising, in series along said path, a ferromagnetic portion and a non-ferromagnetic portion.

* * * * *